US010064513B2

(12) United States Patent
Rehfuss (10) Patent No.: US 10,064,513 B2
(45) Date of Patent: Sep. 4, 2018

(54) MIXED BEVERAGE UNIT

(71) Applicant: BSH Hausgeräte GmbH, München (DE)

(72) Inventor: Evgeni Rehfuss, München (DE)

(73) Assignee: BSH Hausgeräte GmbH, Munich (DE)

(*) Notice: Subject to any disclaimer, the term of this patent is extended or adjusted under 35 U.S.C. 154(b) by 0 days.

(21) Appl. No.: 15/557,228

(22) PCT Filed: Feb. 17, 2016

(86) PCT No.: PCT/EP2016/053359
§ 371 (c)(1),
(2) Date: Sep. 11, 2017

(87) PCT Pub. No.: WO2016/142139
PCT Pub. Date: Sep. 15, 2016

(65) Prior Publication Data
US 2018/0049582 A1 Feb. 22, 2018

(30) Foreign Application Priority Data

Mar. 12, 2015 (DE) .................. 10 2015 204 452
Nov. 23, 2015 (DE) .................. 10 2015 223 031

(51) Int. Cl.
*A47J 31/36* (2006.01)
*A47J 31/44* (2006.01)
(Continued)

(52) U.S. Cl.
CPC ....... *A47J 31/3623* (2013.01); *A47J 31/4492* (2013.01); *B67D 1/004* (2013.01);
(Continued)

(58) Field of Classification Search
CPC . A47J 31/3623; A47J 31/4492; B67D 1/0029; B67D 1/0037; B67D 1/004;
(Continued)

(56) References Cited

U.S. PATENT DOCUMENTS 3,149,556 A * 9/1964 Martin ................ A47J 31/057
210/455
3,292,822 A * 12/1966 Crowder .............. B67D 1/0057
222/129.1
(Continued)

FOREIGN PATENT DOCUMENTS

| EP | 2 345 351 | 7/2011 |
|---|---|---|
| WO | WO 2013/087996 | 6/2013 |
| WO | WO 2014/159458 | 10/2014 |

OTHER PUBLICATIONS

International Search Report for PCT/EP2016/053359 dated Apr. 19, 2016, 2 pages.
(Continued)

*Primary Examiner* — Eric Stapleton
(74) *Attorney, Agent, or Firm* — Nixon & Vanderhye P.C.

(57) ABSTRACT

The invention relates to a beverage unit for producing a beverage. The beverage unit comprises a first provisioning module for providing a first liquid and a second provisioning module for providing a second liquid that contains alcohol. The beverage unit further comprises a taste module for providing additives, wherein the taste module is configured to receive a first capsule, which contains the additives for a portion of a first beverage. Furthermore, the beverage unit comprises a control module configured to determine parameters for producing the first beverage, wherein the parameters indicate a first amount of the first liquid and a second amount of the second liquid. The control module is further configured to bring about that the first amount of the first liquid is provided by the first provisioning module, and to bring about that the second amount of the second liquid is provided by the second provisioning module. Furthermore, the control module is configured to bring about that the first amount of the first liquid and the second amount of the (Continued)

second liquid are mixed with the additives from the first capsule in order to produce the portion of the first beverage.

9 Claims, 3 Drawing Sheets

(51) Int. Cl.
    *B67D 1/00*           (2006.01)
    *B67D 1/08*           (2006.01)

(52) U.S. Cl.
    CPC ......... *B67D 1/0029* (2013.01); *B67D 1/0037* (2013.01); *B67D 1/0043* (2013.01); *B67D 1/0057* (2013.01); *B67D 1/0078* (2013.01); *B67D 1/0857* (2013.01); *B67D 1/0884* (2013.01); *B67D 1/0895* (2013.01); *B67D 2001/0811* (2013.01); *B67D 2210/00125* (2013.01)

(58) Field of Classification Search
    CPC .. B67D 1/0043; B67D 1/0057; B67D 1/0078; B67D 1/0857; B67D 1/0884; B67D 1/0895; B67D 2001/0811; B67D 2210/00125
    USPC ........................................................... 99/275
    See application file for complete search history.

(56) References Cited

U.S. PATENT DOCUMENTS

| | | | | |
|---|---|---|---|---|
| 3,314,357 | A * | 4/1967 | Valente | A47J 31/24 137/535 |
| 3,719,505 | A * | 3/1973 | Mazza | A47J 31/0642 99/275 |
| 3,934,758 | A * | 1/1976 | Kipp | B67D 1/08 222/108 |
| 4,136,202 | A * | 1/1979 | Favre | B65D 85/8043 426/77 |
| 4,757,752 | A * | 7/1988 | Robins | A47J 31/002 99/279 |
| 4,757,754 | A * | 7/1988 | Welker | A47J 31/007 99/291 |
| 4,867,993 | A * | 9/1989 | Nordskog | A47J 31/02 426/110 |
| 4,990,352 | A * | 2/1991 | Newman | A47J 31/3628 426/392 |
| 5,000,351 | A * | 3/1991 | Rudick | B67D 1/0036 222/105 |
| 5,280,747 | A * | 1/1994 | Bonneville | A47J 31/46 99/287 |
| 5,398,595 | A * | 3/1995 | Fond | A47J 31/0668 99/295 |
| 5,472,719 | A * | 12/1995 | Favre | A47J 31/0673 426/112 |
| 5,584,229 | A * | 12/1996 | Anson | A47J 31/002 99/280 |
| 5,649,472 | A * | 7/1997 | Fond | A47J 31/0673 426/433 |
| 5,656,311 | A * | 8/1997 | Fond | B65B 29/02 426/112 |
| 5,778,765 | A * | 7/1998 | Klawuhn | A47J 31/46 99/290 |
| 5,840,189 | A * | 11/1998 | Sylvan | B65D 85/8043 210/474 |
| 5,865,094 | A * | 2/1999 | Kealy | A47J 31/007 141/106 |
| 5,897,899 | A * | 4/1999 | Fond | A47J 31/0678 426/112 |
| 5,948,455 | A * | 9/1999 | Schaeffer | B65D 85/8043 426/112 |
| 5,975,365 | A * | 11/1999 | Hsieh | G07F 13/065 222/129.3 |
| 6,289,948 | B1 * | 9/2001 | Jeannin | A47J 31/407 141/351 |
| 6,305,269 | B1 * | 10/2001 | Stratton | B67D 1/0044 222/459 |
| 6,645,537 | B2 * | 11/2003 | Sweeney | B65D 85/8043 206/222 |
| 6,672,097 | B1 * | 1/2004 | Ashley | A23G 9/04 62/340 |
| 6,758,130 | B2 * | 7/2004 | Sargent | A23F 3/14 426/115 |
| 6,810,788 | B2 * | 11/2004 | Hale | B65D 85/8043 426/433 |
| 6,832,542 | B2 * | 12/2004 | Hu | A47J 31/0668 99/295 |
| 6,849,285 | B2 * | 2/2005 | Masek | B65D 85/8043 426/112 |
| 6,959,642 | B1 * | 11/2005 | Landolt | A47J 31/4485 99/290 |
| 7,004,355 | B1 * | 2/2006 | Crisp, III | B67D 1/0021 222/129.4 |
| 7,021,197 | B2 * | 4/2006 | Chen | A47J 31/46 99/284 |
| 7,083,071 | B1 * | 8/2006 | Crisp, III | B67D 1/0021 222/129.3 |
| 7,108,156 | B2 * | 9/2006 | Fox | B67D 1/0021 222/129.1 |
| 7,223,426 | B2 * | 5/2007 | Cheng | A23F 5/243 222/137 |
| 7,226,631 | B2 * | 6/2007 | Thakur | A23F 5/405 426/477 |
| 7,287,461 | B2 * | 10/2007 | Halliday | A47J 31/4407 426/115 |
| 7,472,643 | B2 * | 1/2009 | Mitchell | A47J 31/407 99/295 |
| 7,559,273 | B2 * | 7/2009 | Levi | A47J 31/0647 99/291 |
| 7,610,849 | B2 * | 11/2009 | Bigge | A47J 31/36 62/390 |
| 7,997,448 | B1 * | 8/2011 | Leyva | B67D 1/0044 222/1 |
| 8,166,868 | B2 * | 5/2012 | Skalski | A47J 31/0668 99/290 |
| 8,215,228 | B2 * | 7/2012 | Skalski | A47J 31/0668 222/129.1 |
| 8,408,118 | B2 * | 4/2013 | Skalski | A47J 31/0668 99/290 |
| 8,434,401 | B2 * | 5/2013 | Skalski | A47J 31/0668 99/290 |
| 8,468,935 | B2 * | 6/2013 | Skalski | A47J 31/0668 99/295 |
| 8,671,827 | B2 * | 3/2014 | Skalski | A47J 31/0668 99/290 |
| 9,233,824 | B2 * | 1/2016 | Kirschner | B67D 1/0058 |
| 9,320,382 | B2 * | 4/2016 | Lo Faro | A47J 31/407 |
| 9,382,119 | B2 * | 7/2016 | Shalev | C01B 31/20 |
| 9,526,371 | B2 * | 12/2016 | Lo Foro | A47J 31/407 |
| 9,630,826 | B2 * | 4/2017 | Green | B67D 1/0058 |
| 9,693,650 | B2 * | 7/2017 | Skalski | A47J 31/46 |
| 9,700,852 | B2 * | 7/2017 | Shalev | A47J 31/407 |
| 9,714,136 | B2 * | 7/2017 | Koeling | B65D 85/8046 |
| 9,788,685 | B2 * | 10/2017 | Kastor | A47J 31/4428 |
| 9,790,076 | B2 * | 10/2017 | Novak | B67D 1/0406 |
| 9,808,113 | B2 * | 11/2017 | Lo Foro | A47J 31/407 |
| 9,867,493 | B2 * | 1/2018 | Novak | A47J 31/407 |
| 9,936,834 | B2 * | 4/2018 | Novak | A47J 31/407 |
| 2001/0035097 | A1 * | 11/2001 | Shaanan | A47J 31/404 99/280 |
| 2002/0078831 | A1 * | 6/2002 | Cai | A47J 31/14 99/295 |
| 2002/0129712 | A1 * | 9/2002 | Westbrook | A47J 31/3676 99/279 |
| 2002/0144603 | A1 * | 10/2002 | Taylor | A47J 31/0642 99/295 |
| 2003/0039731 | A1 * | 2/2003 | Dalton | B65D 85/8043 426/433 |

(56) References Cited

U.S. PATENT DOCUMENTS

| | | | |
|---|---|---|---|
| 2003/0097314 A1* | 5/2003 | Crisp, III | B67D 1/0057 705/28 |
| 2003/0126993 A1* | 7/2003 | Lassota | A47J 31/402 99/279 |
| 2004/0000237 A1* | 1/2004 | Wu | A47J 31/002 99/283 |
| 2004/0118291 A1* | 6/2004 | Carhuff | A47J 31/401 99/275 |
| 2004/0250564 A1* | 12/2004 | Crisp, III | B67D 1/0057 62/398 |
| 2005/0016384 A1* | 1/2005 | Tassinary | A47J 31/057 99/279 |
| 2005/0029287 A1* | 2/2005 | Mobbs | B67D 1/0024 222/1 |
| 2005/0133427 A1* | 6/2005 | Rinker | C02F 1/003 210/209 |
| 2005/0223904 A1* | 10/2005 | Laigneau | A47J 31/0647 99/295 |
| 2005/0247205 A1* | 11/2005 | Chen | A47J 31/057 99/279 |
| 2006/0065127 A1* | 3/2006 | Dalton | B65D 85/8043 99/279 |
| 2006/0249030 A1* | 11/2006 | Bienvenu | A47J 31/3676 99/291 |
| 2006/0278091 A1* | 12/2006 | Rutigliano | A47J 31/007 99/279 |
| 2007/0012719 A1* | 1/2007 | Holler | B67D 1/0078 222/61 |
| 2007/0080169 A1* | 4/2007 | Sher | A47J 31/41 222/129.1 |
| 2007/0144355 A1* | 6/2007 | Denisart | A47J 31/3695 99/275 |
| 2007/0209522 A1* | 9/2007 | Bigge | A47J 31/36 99/279 |
| 2008/0121111 A1* | 5/2008 | Paget | A47J 31/0668 99/295 |
| 2009/0293735 A1* | 12/2009 | Van Dillen | A47J 31/0668 99/295 |
| 2010/0102082 A1* | 4/2010 | Ebrom | A47L 15/4293 340/3.1 |
| 2010/0154644 A1* | 6/2010 | Skalski | A47J 31/0668 99/275 |
| 2010/0154647 A1* | 6/2010 | Skalski | A47J 31/0668 99/290 |
| 2010/0154649 A1* | 6/2010 | Skalski | A47J 31/0668 99/295 |
| 2010/0154651 A1* | 6/2010 | Skalski | A47J 31/0668 99/302 R |
| 2010/0159077 A1* | 6/2010 | Skalski | A47J 31/0668 426/80 |
| 2010/0159078 A1* | 6/2010 | Skalski | A47J 31/0668 426/80 |
| 2010/0263544 A1* | 10/2010 | Kodden | A47J 31/44 99/288 |
| 2011/0020508 A1* | 1/2011 | Santoiemmo | A23L 2/54 426/232 |
| 2012/0058226 A1* | 3/2012 | Winkler | A47J 31/3695 426/79 |
| 2012/0102993 A1* | 5/2012 | Hortin | F25D 23/126 62/189 |
| 2012/0104026 A1* | 5/2012 | Hortin | F25D 31/002 99/275 |
| 2012/0231126 A1* | 9/2012 | Lo Faro | A47J 31/407 426/115 |
| 2013/0064941 A1* | 3/2013 | Taitler | A47J 43/10 426/231 |
| 2013/0129870 A1* | 5/2013 | Novak | B65D 85/73 426/115 |
| 2013/0192472 A1* | 8/2013 | Skalski | A47J 31/0668 99/290 |
| 2013/0233180 A1* | 9/2013 | Belmont | A47J 31/407 99/323.2 |
| 2014/0175125 A1* | 6/2014 | Breault | B67D 1/004 222/129.1 |
| 2014/0261000 A1* | 9/2014 | Weflen | A47J 31/3633 99/295 |
| 2014/0263432 A1* | 9/2014 | Jacobs | B67D 7/3209 222/65 |
| 2014/0272006 A1* | 9/2014 | Schuh | C12G 3/06 426/87 |
| 2014/0272076 A1* | 9/2014 | Nevin | A47J 31/4407 426/590 |
| 2015/0004288 A1* | 1/2015 | McHale | A47J 31/465 426/231 |
| 2015/0013279 A1* | 1/2015 | Swerchesky | A47J 31/407 53/492 |
| 2015/0027155 A1* | 1/2015 | Maruyama | F25B 31/004 62/228.1 |
| 2015/0079240 A1* | 3/2015 | Lo Foro | A47J 31/401 426/115 |
| 2015/0201790 A1* | 7/2015 | Smith | A23F 3/18 426/431 |
| 2015/0201795 A1* | 7/2015 | Tinkler | A47J 31/46 426/231 |
| 2016/0183715 A1* | 6/2016 | Showalter | B67D 1/00 99/285 |
| 2016/0185586 A1* | 6/2016 | Showalter | B67D 1/0804 366/314 |
| 2016/0205988 A1* | 7/2016 | Bird | A23L 2/56 |
| 2016/0263577 A1* | 9/2016 | Ismagilov | B01L 3/50273 |
| 2016/0309763 A1* | 10/2016 | Jetton | A47J 43/04 |
| 2017/0027377 A1* | 2/2017 | Chawla | A47J 31/4485 |

OTHER PUBLICATIONS

Written Opinion of the ISA for PCT/EP2016/053359 dated Apr. 19, 2016, 5 pages.

International Preliminary Report on Patentability for PCT/EP2016/053359 dated Jun. 20, 2017, 17 pages.

* cited by examiner

MIXED BEVERAGE UNIT

This application is the U.S. national phase of International Application No. PCT/EP2016/053359 filed Feb. 17, 2016 which designated the U.S. and claims priority to DE Patent Application No. 10 2015 204 452.1 filed Mar. 12, 2015 and DE Patent Application No. 10 2015 223 031.7 filed Nov. 23, 2015, the entire contents of each of which are hereby incorporated by reference.

The invention relates to an apparatus for producing mixed beverages containing alcohol.

A plurality of different alcoholic beverages are typically consumed in a home. These different alcoholic beverages have to be obtained individually and stored in the home. The provision of different alcoholic beverages in a home is therefore associated with a high level of logistical complexity, a significant storage space requirement and high costs.

US 2014/0272006 A1 describes a method for synthesizing alcoholic beverages. WO2014/159458 A1 describes a system, in which alcoholic beverages can be produced by mixing water and the contents of capsules containing flavorings and alcohol. The measures described in the documents cited above allow different alcoholic beverages to be produced directly in the home but the provision of dedicated capsules containing the flavorings and alcohol for an alcoholic beverage in particular is still associated with a relatively significant outlay.

A system for producing mixed beverages that is built into the door of a refrigerator is set out in the U.S. Pat. No. 7,997,448. The system comprises storage containers for water, alcohol, syrups or concentrates and the like as well as a processor and actuators in order to produce and provide different mixed beverages by mixing syrup or concentrate with water in in some instances alcohol.

The present invention deals with the technical object of further reducing the outlay for providing a plurality of different alcoholic beverages.

This object is achieved by the subject matter of the independent claim. Advantageous embodiments are set out in the dependent claims or description which follows and illustrated in the accompanying drawing.

According to one aspect of the invention a beverage unit for producing a beverage, in particular an alcoholic beverage, is described. The beverage unit comprises a first provision module for providing a first liquid. The first liquid can comprise water in particular. The first provision module can comprise for example a container for holding the first liquid. Alternatively or additionally the first provision module can comprise a line, by way of which the first liquid can be obtained. The beverage unit further comprises a second provision module for providing a second liquid. The second liquid here contains alcohol (for example ethanol or another alcohol that is neutral in taste). The second provision module can comprise for example a container for holding the second liquid. Alternatively or additionally the second provision module can comprise a line, by way of which the second liquid can be obtained. The beverage unit also comprises a taste module for providing additives. The taste module here is designed to hold a first capsule, which contains the additives for a portion of the first beverage. In particular the first capsule can just contain additives (and no alcohol). The additives can include flavorings, taste agents, colorings, preservatives and/or suspended matter. It is possible to use the additives to produce a beverage with a defined taste and with a defined external appearance from the first liquid and/or the second liquid. The first capsule here can contain precisely the quantity of additives required for precisely one portion of the first beverage.

A portion in this context depends on the nature and usual provision of the first beverage for a consumer. A portion of beer can be between 0.2 l and 1.0 l, in particular 0.2 l, 0.3 l, 0.5 l or 1.0 l; a portion of red wine or white wine 0.1 l or 0.2 l. A portion of fortified wine such as port or sherry may be 50 cl, a portion of spirit such as liqueur, fruit brandy, cognac or whisky may be 20 cl or 40 cl.

The beverage unit further comprises a control module, which is designed to determine parameters for producing a first beverage, the parameters indicating a first quantity of the first liquid and a second quantity of the second liquid. The control module is further designed to prompt the first provision module to provide the first quantity of first liquid and to prompt the second provision module to provide the second quantity of second liquid. The control module is also designed to prompt the mixing of the first quantity of first liquid and the second quantity of second liquid with the additives from the taste module (in particular with the additives from the first capsule), in order to produce the first beverage. In particular precisely one portion of the first beverage can be produced from (all) the additives in the first capsule.

The beverage unit is therefore designed to take the alcohol portion of a beverage from a second provision module separately from a capsule containing additives. This allows small and compact capsules to be used, thus reducing the outlay and in particular the space requirement for producing alcoholic beverages. Also the provision of alcohol-free capsules simplifies the handling of such capsules and makes it safer (particular in respect of the protection of minors). The use of capsules containing the quantity of additives required for precisely one portion of a beverage also allows an (alcoholic) beverage to be produced in a flexible and convenient manner and a compact beverage unit to be provided.

The first capsule can contain the quantity and mixture of additives required to produce the first beverage. Other capsules can also be provided containing different quantities and mixtures of additives for producing different beverages. It is thus possible to produce beverages in different portions (using different capsules).

The first capsule can comprise an information tool showing information about the first beverage that can be produced with the first capsule. The information tool can comprise for example a machine-readable code on the first capsule, a color of the first capsule, a shape of the first capsule and/or an identification number on the first capsule. The control module can be designed to determine the parameters for producing the first beverage based on the information tool. For example the information tool can provide a link to an entry in a database, in which the parameters for producing the first beverage are stored. The control module can then obtain the parameters from the database. Using an information tool allows easy and reliable production of different beverages.

The beverage unit can comprise at least one temperature-control module for controlling the temperature of (in particular for cooling) the first and/or second liquid.

The beverage unit can comprise a mixing container and the first provision module can be connected to the mixing container by way of one or more first valves. The second provision module can similarly also be connected to the mixing container by way of one or more second valves. The control module can be designed to activate the one or more first/second valves to provide the first quantity of the first liquid and/or the second quantity of the second liquid in the mixing container.

The first provision module can be designed to provide the first liquid at a base temperature by way of a first base valve and the first liquid at a supplementary temperature by way of a first supplementary valve, the supplementary temperature and the base temperature being different. A temperature-control module of the beverage unit can be designed for example to cool the first liquid to the base temperature. On the other hand the supplementary temperature can be an ambient temperature of the beverage unit. Providing the first liquid (and where applicable the second liquid) at different temperatures allows efficient temperature control of a beverage to be produced. For example the first temperature for producing the first beverage can indicate the temperature at which the first liquid is to be provided in the mixing container. The control module can be designed to activate the first base valve and the first supplementary valve as a function of the first temperature, so that the first liquid is at the first temperature in the mixing container. The second liquid can similarly also be provided at a base temperature and a supplementary temperature.

The beverage unit can comprise an aeration module, which is designed to provide carbonic acid (in other words carbon dioxide) in the mixing container by way of an aeration valve. The parameters for producing the first beverage can indicate a quantity of carbonic acid and the control module can be designed to activate the aeration valve to provide the indicated quantity of carbonic acid in the mixing container. This allows the beverage unit also to produce aerated beverages.

The beverage unit can comprise an outlet valve connecting the mixing container to the taste module. The beverage unit can further comprise an actuator, which is designed to convey a liquid mixture (for example a mixture of first liquid, second liquid and/or carbonic acid) from the mixing container through the outlet valve to the taste module. For example the liquid mixture can be pressed through the taste module (in particular through the first capsule in the taste module) so that the liquid mixture absorbs the additives, thereby forming the first beverage.

The mixing container can comprise a movable piston, which can enlarge or reduce a volume of the mixing container. The piston can be driven by an actuator (for example by an electric motor). The one or more first/second valves can be arranged in such a manner that the first liquid is drawn into the mixing container through the one or more first valves or the second liquid is drawn into the mixing container through the one or more second valves when the volume of the mixing container is enlarged by the piston. The outlet valve can also be arranged in such a manner that the liquid mixture is pushed out of the mixing container through the outlet valve when the volume of the mixing container is reduced by the piston. The one or more first/second valves and the outlet valve here can each comprise a one-way valve. Using a piston allows a mixed beverage to be produced in an economical and space-saving manner.

The beverage unit can comprise a user interface (for example on a touch-sensitive screen), which allows a user to input parameters for producing the first beverage. It is thus possible to tailor the production of a beverage in a user-friendly manner. In particular the second quantity of the second liquid can be tailored to vary the alcohol content of the first beverage (for example a low, medium or high alcohol content). For example profiles with user-specific parameters can be input and stored for different beverages, these then being able to be taken into account automatically for the production of a beverage.

The taste module can comprise a plurality of cartridges and/or one multicartridge with a corresponding plurality of different additives (where applicable in addition to a capsule). The parameters for producing the first beverage can indicate quantities for the plurality of additives required to produce the first beverage. The control module can be designed to prompt the provision of the required quantities of additives by way of the plurality of cartridges/by way of the multicartridge. This further increases flexibility when producing different beverages.

According to one aspect of the invention a refrigeration appliance with a refrigeration chamber for cooling food is described. The refrigeration appliance comprises for example a refrigerator, a freezer cabinet, a chest freezer, a beverage cabinet, a chiller cabinet, etc. The refrigeration appliance can be designed in particular to hold beverages and other foods in the refrigeration chamber. The refrigeration appliance comprises a refrigeration module, which is designed to cool the refrigeration chamber of the refrigeration appliance. Typical temperatures in the refrigeration chamber here are in the region of 10° C., 5° C., 0° C. or below. The refrigeration appliance can comprise for example a compressor, a thermoelectric element and/or an absorber. The refrigeration appliance further comprises a beverage unit as described in this document for producing a beverage. The beverage unit can use the refrigeration module of the refrigeration appliance to produce a beverage so the beverage unit can be produced in an economical and space-saving manner. The beverage unit can be used to produce alcoholic and/or non-alcoholic beverages.

The refrigeration module can be designed to cool the second liquid provided by the second provision module to a temperature below the freezing point of water. This is particularly advantageous in order to provide alcoholic beverages at relatively low temperatures (for example around approx. 0° C. or below) without using ice.

It should be noted that the methods, apparatuses and systems described herein can be used both alone and in combination with other methods, apparatuses and systems described herein. Also all aspects of the methods, apparatus and systems described herein can be combined with one another in many different ways. In particular the features of the claims can be combined with one another in many different ways.

Exemplary embodiments of the invention are described in more detail below with reference to the figures in the accompanying drawing, in which.

As set out in the introduction, the present document deals with the efficient production of a plurality of different mixed beverages in a private home. Private homes typically have one or more chiller or refrigeration appliances (for example a refrigerator, a temperature-controlled beverage cabinet, a temperature-controlled wine cabinet, a freezer cabinet, etc.). Such a refrigeration appliance can be provided with a beverage unit, which is designed to provide a plurality of different mixed beverages. Alcoholic and non-alcoholic beverages in particular can be provided as required and in the desired portions by a beverage unit integrated in a refrigeration appliance. The integration of a beverage unit in a refrigeration appliance allows the efficient use of one or more temperature-control modules (in particular one or more refrigeration modules) already present in the refrigeration appliance, thereby allowing economical provision of the beverage module. However the present disclosure is not restricted to the integration of a beverage unit in an existing refrigeration appliance. A refrigeration appliance tailored specifically and particularly to the beverage unit can equally be provided.

Figure 1:
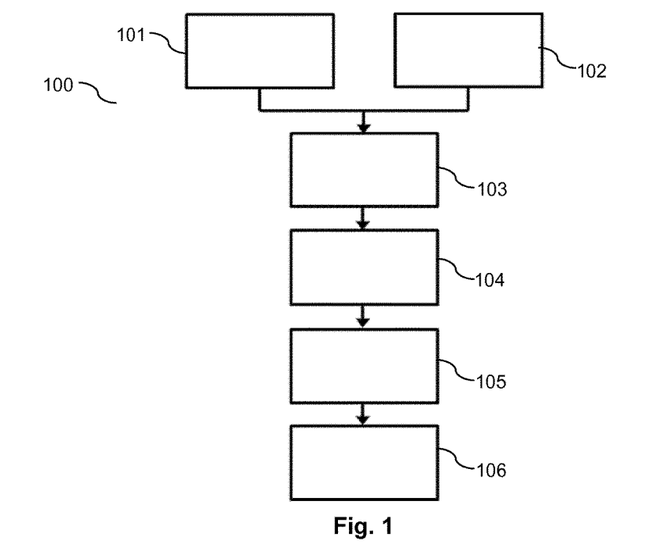
FIG. 1 shows a block diagram illustrating the principle of mixed beverage production.

FIG. 1 illustrates the principle 100 of beverage production by a beverage unit. Liquid basic components 101, 102 (in other words liquids), in particular a water-based component 101 (e.g. drinking water) and an alcohol-based component 102 (e.g. ethanol or alcoholic beverages that are neutral in flavor, such as vodka), are provided in containers. The liquid basic components 101, 102 can be temperature-controlled, in particular can be cooled (reference character 103). Carbonic acid 104 can also be supplied if required. A concentrate containing additives 105 (e.g. in a liquid and/or powdered state), which creates the particular taste, is also added to the beverage. It is thus possible to produce a plurality of different beverages on the basis of a limited number of liquid basic components 101, 102 by using concentrates with a different combination of additives 105. In particular it is possible to produce different beverages as required and in the desired portions (for example at the push of a button).

The beverages can be delivered at different temperatures and can have carbonic acid 104 and/or ice added if required. The concentrate/combination can be introduced into the beverage unit in the form of a handy capsule or cartridge. Such a capsule contains all the necessary contents (also referred to as additives 105), such as flavorings, colorings and suspended matter, for replicating an alcoholic or non-alcoholic original beverage (for example wine, whisky, cocktail, juice or soda) that is optimized in respect of visual perception, taste and mouth feel.

A capsule containing the additives 105 contains the quantities of substances required for a portion of a beverage. The beverage unit can also comprise a plurality of cartridges or one multi-substance cartridge with different contents. Depending on the beverage selected, the beverage unit can then draw specific quantities of contents from the capsule 105 and one or more cartridges, in order to create the selected beverage. Empty cartridges can then be refilled or replaced as required.

A portion in this context depends on the nature and usual provision of the first beverage for a consumer. A portion of beer can be between 0.2 l and 1.0 l, in particular 0.2 l, 0.3 l, 0.5 l or 1.0 l; a portion of red wine or white wine 0.1 l or 0.2 l. A portion of fortified wine such as port or sherry may be 50 cl, a portion of spirit such as liqueur, fruit brandy, cognac or whisky may be 20 cl or 40 cl.

The temperature of a beverage can be controlled by way of one or more heat exchangers, connected to the refrigeration equipment (in other words one or more refrigeration modules) of the refrigeration appliance, in which the beverage unit is located. In some instances the beverage unit can comprise one or more further cooling and/or heating elements (e.g. flow-through coolers and heaters) for bringing a beverage or liquid basic component 101, 102 to a desired temperature.

Figure 2:
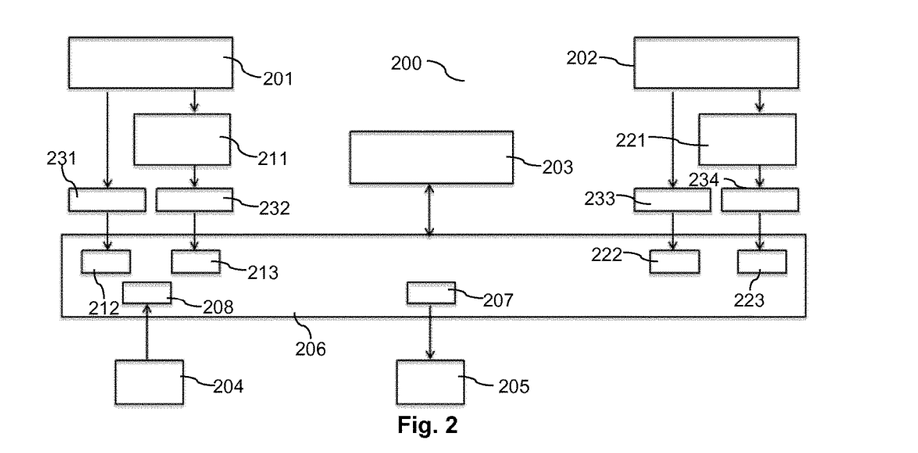
FIG. 2 shows exemplary components of a beverage unit for producing a mixed beverage.

FIG. 2 shows a block diagram of exemplary modules of a beverage unit 200. The beverage unit 200 has a first container 201 for a first liquid basic component 101 (e.g. drinking water). Alternatively or additionally the beverage unit 200 can be connected directly to a line (e.g. a drinking water line) to provide the first basic component 101. The beverage unit 200 further comprises a second container 202 for holding a second liquid basic component 202 (e.g. alcohol). The second basic component 202 can be provided for example by replaceable containers 202. The basic components or liquids 101, 102 can be brought to a respective base temperature 231, 233 by the refrigeration modules of the refrigeration appliance in which the beverage unit 200 is located where applicable. The beverage unit 200 can also comprise temperature-control modules 211, 221 for providing the basic components 101, 102 at a further temperature 232, 234 (also referred to as supplementary temperature). By mixing a liquid basic component 101 at base temperature 231 and supplementary temperature 232 in differing mixing ratios it is possible to provide the liquid basic component 101 at a plurality of different temperatures (between the base temperature 231 and the supplementary temperature 232).

A temperature-control module 211, 221 can be designed to warm or heat a liquid basic component 101, 102. To this end a temperature-control module 211, 221 can comprise a flow-through heater for example. For example a basic component 101 can be stored in a cooled state. In particular the basic component 101 can be cooled by a refrigeration module of a refrigeration appliance and kept in the container 201 in the cooled state. The basic component 101 can then be heated by the temperature-control module 211. It is thus possible to store a plurality of different liquid basic components 101, 102 efficiently at the same temperature and only to tailor the temperatures of the basic components 101, 102 for mixing by means of the temperature-control module 211, 221.

Different quantities of the basic components 101, 102 at different temperatures can be supplied to a mixing container 206 by way of valves 212, 213, 222, 223. Carbonic acid 104 can also be supplied to the mixing container by way of a valve 208. The valves can be one-way valves. The beverage unit 200 comprises one or more actuators 203, which are designed to bring about the supply of the different components 101, 102, 104 to the mixing container 206. Examples of actuators are for example pumps or electric motors.

The basic mixture of basic components 101 and 102 as well as carbonic acid 104 where applicable (also referred to as the liquid mixture) can be supplied to a taste module 205 by way of an exit valve 207. The taste module 205 can contain for example a capsule containing additives 105, in particular flavorings, colorings and/or suspended matter, as required for producing a specific beverage. The basic mixture can be pushed through such a capsule by an actuator 203 for example, so that the basic mixture mixes with the additives 105 to provide the desired beverage. Alternatively or additionally the taste module 205 can comprise means for mixing the basic mixture with the additives 105 (for example a further mixing container).

It should be noted that the mixing container 206 and the taste module 205 can be combined. In particular the basic components 101, 102 and the additives 105 can be mixed in a shared container. For example mixing can take place directly in a capsule containing additives 105. Alternatively a specially shaped container can be used for mixing.

A capsule containing additives 105 preferably has a geometry that helps the capsule empty completely during mixing with the basic mixture. This allows good beverage reproducibility to be achieved. For example the capsule can be syringe-shaped. In particular the capsule can be shaped such it functions in the manner of a syringe to allow the additives 105 from the capsule to mix with the basic mixture. For example almost all the additives 105 can be conveyed out of the capsule into the basic mixture by a piston.

A beverage unit 200 integrated in a refrigeration appliance (for example for home or professional purposes) is thus described, which allows a plurality of different alcoholic and non-alcoholic beverages to be prepared as required and in the desired portions. Capsules can contain the additives 105 required for the taste and mouth feel. These additives 105 can be supplemented with the water 101 cooled in the refrigeration appliance and if required with alcohol 102, carbonic acid 104, ice, etc. This allows alcoholic beverages, such as for example beer, wine, whisky, various cocktails, etc., and non-alcoholic beverages, such as juice, soda, etc., to be prepared in different taste directions in the desired portions, as required and at the push of a button.

Drinking water 101 can be provided by a container 201 (storage system) and/or by an inlet with a fresh water connector. The container 201 or supply system (generally referred to as the first provision module 201) can be integrated in the refrigeration appliance. The drinking water can be processed if required (for example by a carbon filter, osmosis filter, etc.). The alcohol component 102 (ethanol or other alcoholic beverages) can be supplied from a second container 202 (generally referred to as the second provision module 202). The second container 202 can have an integrated heat exchanger for cooling the alcohol component 102. Alternatively the container 202 can be integrated in the refrigeration/freezer chamber (for example in the door) of the refrigeration appliance, so the alcohol component 102 is cooled by way of the container wall. The alcohol component 102 can be used for further functions, for example for cleaning and/or rinsing the beverage unit 200.

The desired temperature of the beverage to be created can be set by mixing liquids (water 101 and/or alcohol 102) at different temperatures. The alcohol component 102 in particular is suited to setting relatively low temperatures due to its low freezing point, as the alcohol component 102 can be cooled to below the freezing point of water even in the liquid state. To this end the second container 202 can be located in the freezer chamber or in direct proximity to an evaporator of the refrigeration appliance. The temperature of the liquids 101, 102 can be influenced both individually and also in a finished beverage mixture (for example by means of heat exchangers, cooling element and/or heating element). Temperature control can also take place after the end of the mixing process directly before delivery of the beverage (for example using the flow-through cooling principle by means of evaporator, heat exchanger and/or ice).

A capsule or cartridge contains the additives 105 (flavoring, coloring, bulking agents and suspended matter, etc.) required for the respective beverage. A capsule or cartridge can be discarded after use. Instead of a capsule a multi-substance cartridge system or a plurality of individual cartridges can be used, functioning in the manner of combined cartridges for inkjet printing and therefore able to replicate a plurality of different beverages. The quantities of additives 105 required for different beverages can then be supplied to a mixer (for example the mixing container 206) from the cartridges.

A supply of carbonic acid 104 may be required depending on the beverage (for example to prepare beer). Carbonic acid 104 can be supplied in an additional mixing module if required. Alternatively mixing with carbonic acid 104 can take place directly in or at the capsule containing additives 105.

A beverage to be created is defined by a capsule or cartridge system and delivered as required and in the desired portions. The quantity of liquid basic components 101, 102 and carbonic acid 104 can be controlled here by way of information obtained from the capsule or cartridge. It can also be possible for a user to influence individual parameters of the beverage to be created by way of a user interface. Exemplary parameters for producing a beverage are temperature, quantities and quantity distributions, for example in relation to additives, alcohol, water, etc.

Figure 3:
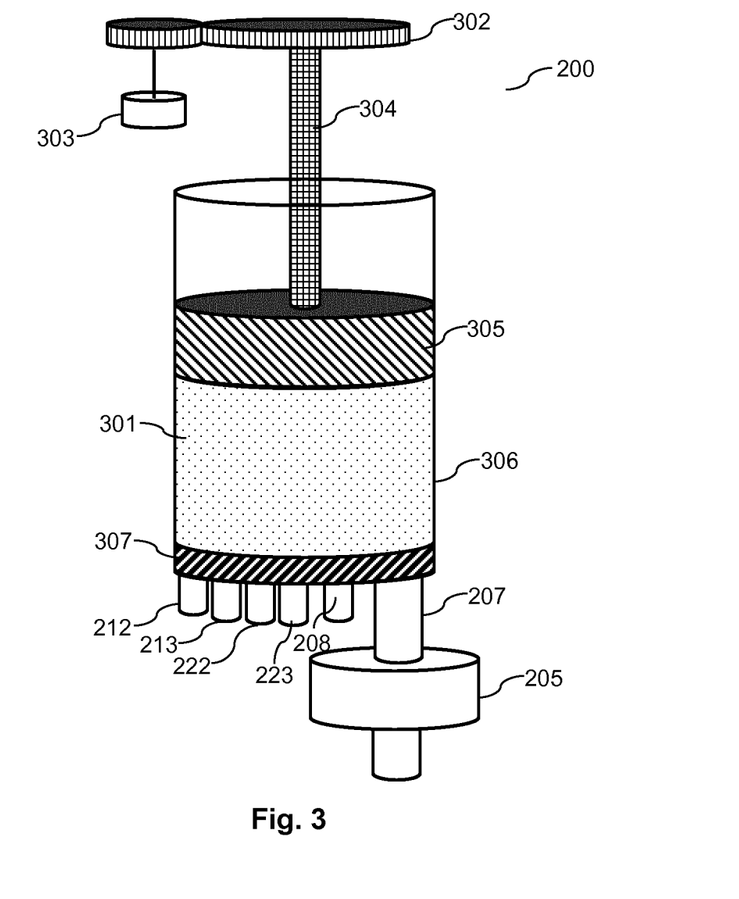
FIG. 3 shows an exemplary configuration of a beverage unit for producing a mixed beverage.

FIG. 3 shows an exemplary structure of a beverage unit 200. The beverage unit 200 comprises a cylinder 306 for creating a basic mixture or a liquid mixture 301 from a plurality of liquid basic components 101, 102. A movable piston 305 can be moved away from the base 307 of the cylinder 306, to draw the basic components 101, 102 and in some instances carbonic acid 104 into the interior of the cylinder 306 by way of the valves 212, 213, 222, 223, 208. The movement of the piston 305 can be brought about by way of a spindle 304, a spindle nut 302, a transmission unit and an electric motor 303. The ratios of the quantities of basic components 101, 102 supplied or carbonic acid 104 can be set by way of the opening width of the respective valves 212, 213, 222, 223, 208. The total quantity of basic mixture 301 can be set by way of the travel of the piston 305.

When a sufficient quantity of basic mixture 301 is present, the piston 305 can be moved toward the base 307 of the cylinder 306 to convey the basic mixture 301 to the taste module 205 by way of the exit valve 207. The finished beverage can then be provided at the outlet of the taste module 205. The beverage unit 200 illustrated in FIG. 3 allows a mixed beverage to be produced efficiently with just one actuator 203, 303.

Figure 4:
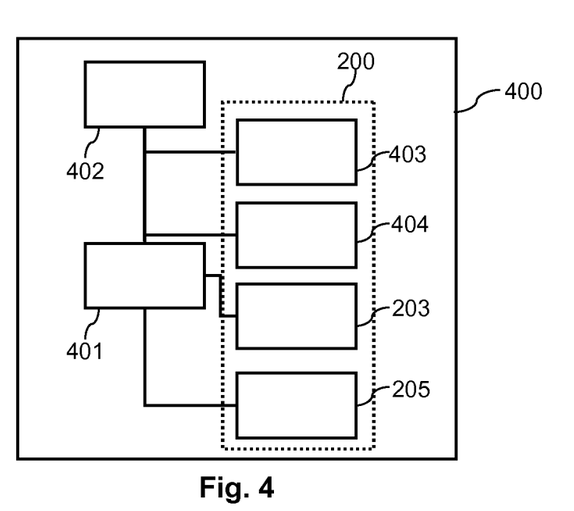
FIG. 4 shows a block diagram of a refrigerator with a beverage unit for producing a mixed beverage.

FIG. 4 shows a block diagram of an exemplary refrigeration appliance 400. The refrigeration appliance 400 or beverage unit 200 comprises a control module 401, which is designed to control the production of a beverage by the beverage unit 200. The refrigeration appliance 400 can comprise a user interface 402, which allows a user to prompt the production of a beverage by the beverage unit 200 and/or to set parameters relating to the production of a beverage (for example a desired temperature or defined composition).

As set out above, the beverage unit 200 comprises one or more temperature-control modules 403 (in particular refrigeration modules) for controlling the temperature of one or more basic components 101, 102 of the basic mixture 301 and/or of the finished beverage. At least some of the one or more temperature control modules 403 can be provided by refrigeration modules of the refrigeration appliance 400 that are already present. The beverage unit 200 further comprises a plurality of valves 404, which can control the supplied quantity of liquid basic components 101, 102 and the supplied quantity of carbonic acid 104. The beverage unit 200 also comprises one or more actuators 203, by means of which the basic mixture 301 can be created and/or by means of which the basic mixture 301 can be mixed with the additives 105.

The beverage unit 200 comprises a taste module 205, which is designed to provide the additives 105 required for a beverage and mix them with the basic mixture 301. The additives 105 can be provided for example by a capsule, which can be introduced by a user into a capsule holder of the taste module 205. The taste module 205 can be designed to determine information relating to the beverage to be created based on the capsule introduced. For example the information can indicate the quantity and composition of basic mixture 301 required to create a beverage and/or the temperature control required.

The control module 401 can be designed:
- to determine that a beverage is to be created (for example based on an input by way of the user interface 402 and/or due to the fact that a capsule has been introduced into the taste module 205);
- to determine the parameters (in particular the quantity, composition and/or temperature control of the basic mixture 301) of the beverage (for example based on an input by way of the user interface 402 and/or due to the capsule introduced); and
- to prompt the temperature-control modules 403, the valves 404 and/or the actuators 203 to create the beverage.

The refrigeration appliances 400 can comprise for example beverage refrigeration appliances for the home and/or for hotels. The beverage unit 200 can be integrated for example in the door of a refrigerator 400. The beverage unit 200 can also be integrated for example in a refrigeration compartment and/or in an automated beverage dispenser. It is also possible for the beverage unit 200 to be integrated in a bar.

The beverage unit 200 for a refrigeration appliance 400 described in this document allows a plurality of different beverages to be produced as required in an efficient manner. This reduces the logistical complexity and cost of providing different beverages. In particular it is not necessary to store or transport a plurality of bottles for the different beverages, reducing the amount of space required and the transport and storage outlay. The described beverage unit 200 allows beverages to be tailored individually in respect of taste, mouth feel, texture, etc. The provision of portions means that there is less beverage waste. By integrating the beverage unit 200 in a refrigeration appliance 400 it is possible to use refrigeration equipment already present, resulting in an economical system for producing beverages. The described beverage unit 200 also allows an individual tailoring of beverages to the requirements of different users (for example it is possible to add specific substances such as minerals, vitamins, etc. to the beverages).

The present invention is not restricted to the exemplary embodiments shown. It should be noted in particular that the description and figures are only intended to illustrate the principle of the proposed methods, apparatuses and systems.

The invention claimed is:

1. A beverage unit for producing a beverage, wherein the beverage unit comprises:
   first provision module for providing a first liquid;
   a second provision module for providing a second liquid; the second liquid containing alcohol;
   a taste module for providing additives; wherein the taste module is designed to hold a first capsule, which contains additives for a portion of a first beverage;
   a control module, which is designed,
   to determine parameters for producing the first beverage, wherein the parameters indicate a first quantity of first liquid and a second quantity of second liquid;
   to prompt the first provision module to provide the first quantity of first liquid:
   to prompt the second provision module to provide the second quantity of second liquid; and
   to prompt the mixing of the first quantity of first liquid and the second quantity of second liquid with the additives from the first capsule, in order to produce the portion of the first beverage, wherein
   the beverage unit comprises a mixing container;
   the first provision module is connected to the mixing container by way of one or more first valves;
   the second provision module is connected to the mixing container by way of one or more second valves; and
   the control module is designed
   to activate the one or more first valves to provide the first quantity of the first liquid in the mixing container; and
   to activate the one or more second valves to provide the second quantity of the second liquid in the mixing container.

2. The beverage unit as claimed in claim 1, wherein the beverage unit is designed to use the second liquid to clean and/or rinse the beverage unit.

3. The beverage unit as claimed in claim 1, wherein
   the first capsule comprises an information tool showing information about the first beverage that can be produced with the first capsule; and
   the control module is designed to determine the parameters for producing the first beverage based on the information tool.

4. The beverage unit as claimed in claim 3, wherein the information tool comprises one or more of: a machine-readable code on the first capsule, a color of the first capsule, a shape of the first capsule and/or an identification number on the first capsule.

5. The beverage unit as claimed in claim 1, wherein
   the beverage unit comprises an outlet valve connecting the mixing container to the taste module; and
   the beverage unit comprises an actuator , which is designed to convey a liquid mixture from the mixing container through the outlet valve to the taste module.

6. The beverage unit as claimed in claim 5, wherein
   the mixing container comprises a movable piston, which can enlarge or reduce a volume of the mixing container;
   the one or more first valves are arranged in such a manner that the first liquid is drawn into the mixing container through the one or more first valves when the volume of the mixing container is enlarged by the piston;
   the one or more second valves are arranged in such a manner that the second liquid is drawn into the mixing container through the one or more second valves when the volume of the mixing container is enlarged by the piston; and
   the outlet valve is arranged in such a manner that the liquid mixture is pushed out of the mixing container through the outlet valve when the volume of the mixing container is reduced by the piston.

7. The beverage unit as claimed in claim 1, wherein
   the beverage unit comprises at least one temperature-control module for controlling the temperature of the second liquid; and
   the temperature-control module is designed to cool the second liquid in such a manner that the second liquid is in the liquid state and its temperature is below the freezing point of water.

8. The beverage unit as claimed in claim 1, wherein the beverage unit comprises a user interface that allows a user to set the second quantity of second liquid for the first beverage.

9. A refrigeration appliance, wherein the refrigeration appliance comprises
   a refrigeration module, which is designed to cool a refrigeration chamber of the refrigeration appliance; and
   a beverage unit as claimed in claim 1.

* * * * *